T. F. COCKE.
Ditching-Machines.
No. 152,792. Patented July 7, 1874.
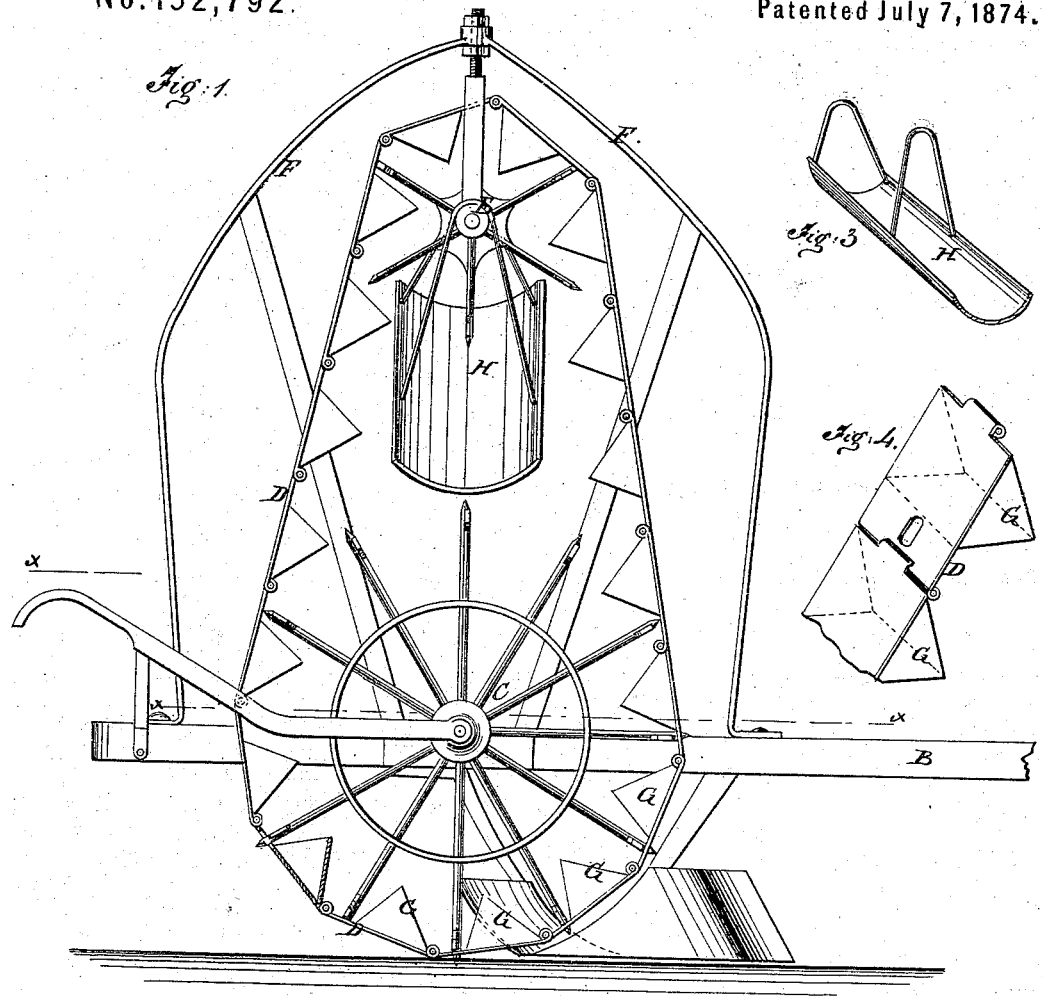
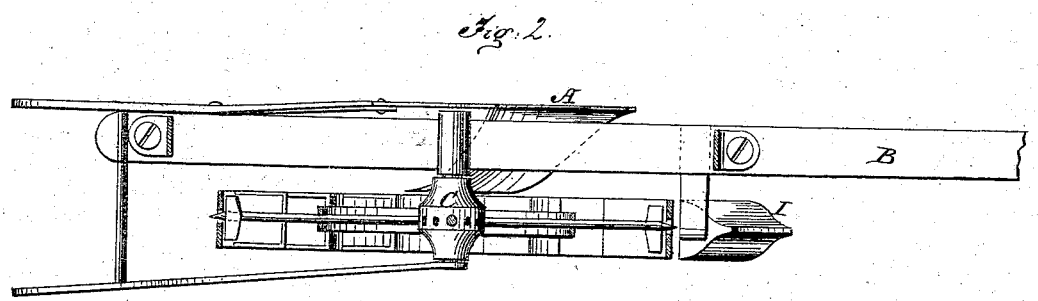
WITNESSES:
INVENTOR:
T. F. Cocke
BY
ATTORNEYS.

UNITED STATES PATENT OFFICE.

THOMAS F. COCKE, OF ST. LOUIS, MISSOURI.

IMPROVEMENT IN DITCHING-MACHINES.

Specification forming part of Letters Patent No. 152,792, dated July 7, 1874; application filed December 29, 1873.

*To all whom it may concern:*

Be it known that I, THOMAS F. COCKE, of St. Louis, in the county of St. Louis and State of Missouri, have invented a new and Improved Ditching-Machine, of which the following is a specification:

My invention consists in an endless chain of buckets, and wheels having spokes, which engage with said chain; and the same being attached to a plow of ordinary or suitable construction, as hereinafter described.

Figure 1 is a side elevation of a ditching-machine contrived according to my invention, with an endless belt for carrying the buckets. Fig. 2 is a horizontal section of the same, taken on the line $x\,x$ of Fig. 1. Fig. 3 is a perspective view of the spout for discharging the earth from the top of the bank, and Fig. 4 is a perspective view of a portion of the endless elevator.

Similar letters of reference indicate corresponding parts.

A represents a plow of any ordinary kind, except that the beam B may be prolonged sufficiently for a tongue. On the right-hand side of the plow I have, in this example, arranged a wheel, C, the rim D of which is a long endless belt or chain of plates jointed together and running up over a sprocket-wheel, E, on an elevated frame, F, and carrying buckets G, which, in passing under the wheel C, go alongside of the mold-board of the plow, so as to receive the earth turned over by it, and carry it up and discharge it into the spout H, to be thrown upon the bank at the side; said spout being hung from the frame F, or the hub of the wheel E, so as to receive the earth as it falls from the buckets. The wheel C is revolved by traction on the bottom of the furrow previously made. In some cases it might be advantageous to provide the upper wheel E with a rim, and to form projections or notches on that, in place of constructing it as here shown.

Having thus described my invention, I claim as new and desire to secure by Letters Patent—

The combination, with a plow and vertical supporting-frame, F, of the endless chain D, provided with buckets G and orifices, as specified, the hub and spoke-wheel C, and sprocket-wheel E, as shown and described, to operate as specified.

THOMAS F. COCKE.

Witnesses:
J. GALHULY,
R. F. HAUSNER.